April 27, 1937. E. B. HUDSON 2,078,712
SEGMENT BEARING
Filed Jan. 18, 1935 3 Sheets-Sheet 1

INVENTOR,
Edwin B. Hudson
BY Allen & Allen
ATTORNEYS.

April 27, 1937.  E. B. HUDSON  2,078,712
SEGMENT BEARING
Filed Jan. 18, 1935   3 Sheets-Sheet 2

INVENTOR
Edwin B. Hudson
BY Allen & Allen
ATTORNEYS.

April 27, 1937.  E. B. HUDSON  2,078,712

SEGMENT BEARING

Filed Jan. 18, 1935  3 Sheets-Sheet 3

INVENTOR,
Edwin B. Hudson
BY Allen & Allen
ATTORNEYS.

Patented Apr. 27, 1937

2,078,712

UNITED STATES PATENT OFFICE 2,078,712

SEGMENT BEARING

Edwin B. Hudson, Middletown, Ohio, assignor to The American Rolling Mill Company, Middletown, Ohio, a corporation of Ohio Application January 18, 1935, Serial No. 2,403

15 Claims. (Cl. 80—38)

My invention relates to the provision of segment bearings for non-rotatable shafts in installations where high bearing loads are to be encountered, such as in backing up rolls in four-high rolling mills, for example. By the provision of a bearing such as I am about to describe, it is possible to use much heavier shafts, and thereby to increase the capacity thereof to carry high loads.

In my copending application, Ser. No. 746,539, filed October 2, 1934, I have shown a segmental bearing, of which the bearing of this invention is a variation and an improvement.

The problem of adapting anti-friction bearings to rolling mills, for example, has always been a serious one. There is very little room in the mill housings for the use of relatively bulky anti-friction bearings surrounding the roll necks; but aside from this, the difficulties have been particularly serious where the bearing must sustain and transmit to the shaft the very heavy pressures of rolling. The anti-friction bearings heretofore considered suitable are bearings involving balls or rollers, which members normally have a point or line contact with the face members in the bearing. Such contacts are not suitable for the transmission of great pressures.

It has been proposed to construct mills having working rolls which are small relative to backing rolls, with solid shafts for the backing rolls, and rotatable sleeves upon the solid shafts with anti-friction means therebetween, the outer surfaces of the sleeves constituting the backing surfaces of the rolls. While an effectively larger bearing area may be obtained in this way, yet the same problem arises in serious degree. Hitherto no one has solved the problem of diminishing friction radically in such structures while providing broad areas of effective pressure-transmitting contact between cooperating bearing members.

It is an object of my invention to provide a bearing for such purposes which will be free from the undesirable elements encountered in ball or roller bearings of such size and capacity.

It is also an object of my invention to provide a bearing which will be capable of withstanding very heavy loads, both sustained and sudden or impact loads, and which will not wear "out of round" and which will be easily accessible for inspection and replacement of parts.

It is another object of my invention to provide a bearing of the tiltable segment type, in which all segments are passed alternately through a loaded and an unloaded zone to minimize wear, and to assist in the building up of oil films under each segment.

It is a further object of my invention to provide a bearing as above outlined, in which the segments are carried on an outer raceway, and to provide means whereby an adequate amount of oil is supplied to the segments during their operations.

Another object of my invention is to provide a bearing of high radial capacity, by utilizing the large space within the roll, and to provide a nonrotating supporting shaft of unusual stiffness by increasing the section modulus at the middle section where the greatest bending moment occurs, thereby reducing the deflection to a minimum.

It is an object of my invention to provide a novel type of rolling mill construction as hereinafter set forth.

A further object of my invention is to reduce the replacement cost by the use of a sleeve type of roll, which is only a small fraction of the weight of a full sized back-up roll as is now used.

Attempts have been made in the past to shrink ring sections onto old rolls which have been turned down to provide new wearing surfaces, and these attempts have involved problems arising from the fact that it has been found difficult to keep such fits tight on account of the expansion of the ring section under the influence of heat. With this difficulty in view, it is a further object of my invention to provide an automatic take-up to compensate for the expansion of the ring section due to heat.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part hereof, and in which.

Figure 1:
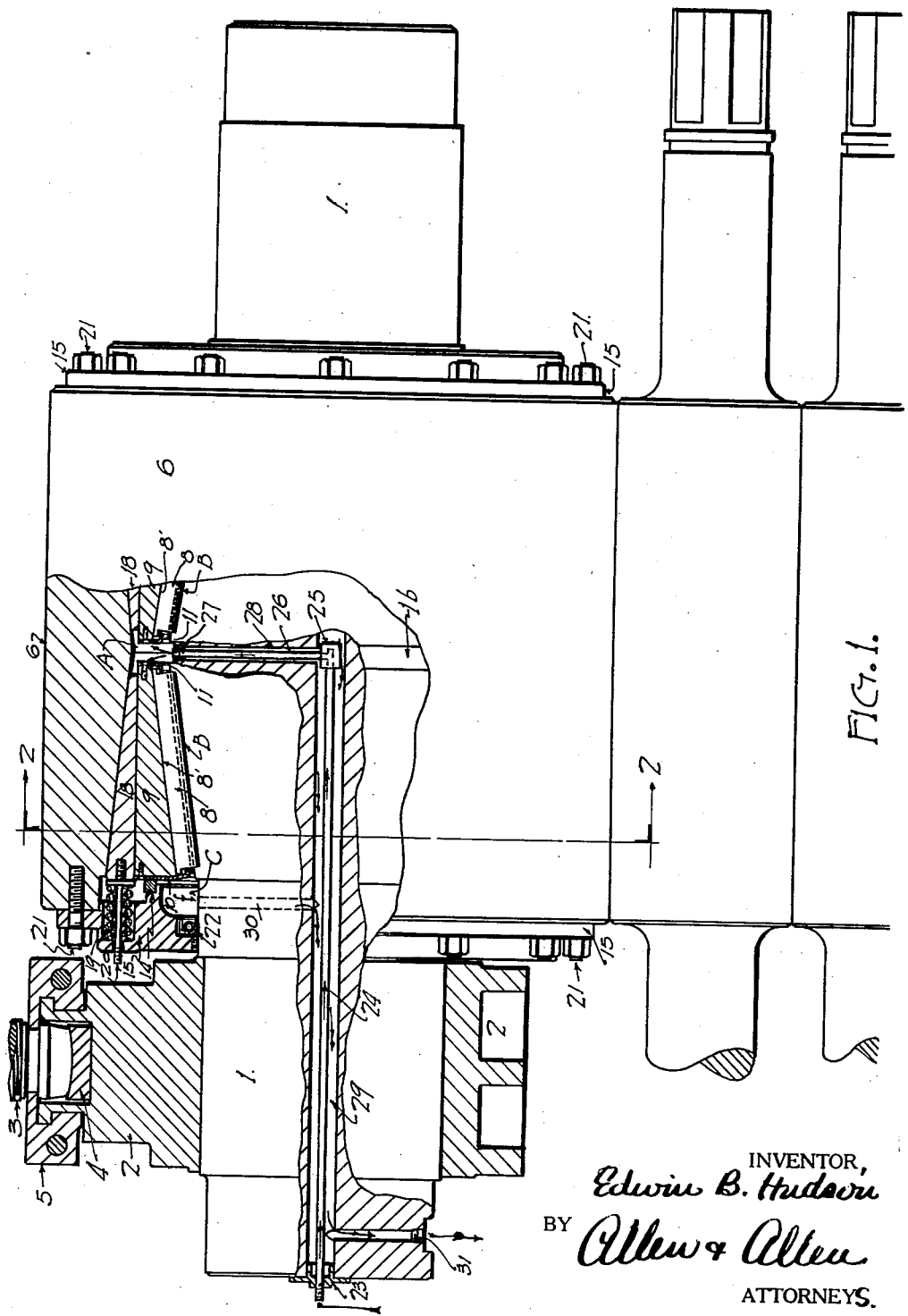
Fig. 1 is an elevation of several of the rolls in a four-high rolling mill, with parts in section to show my novel bearing.
Figure 2:
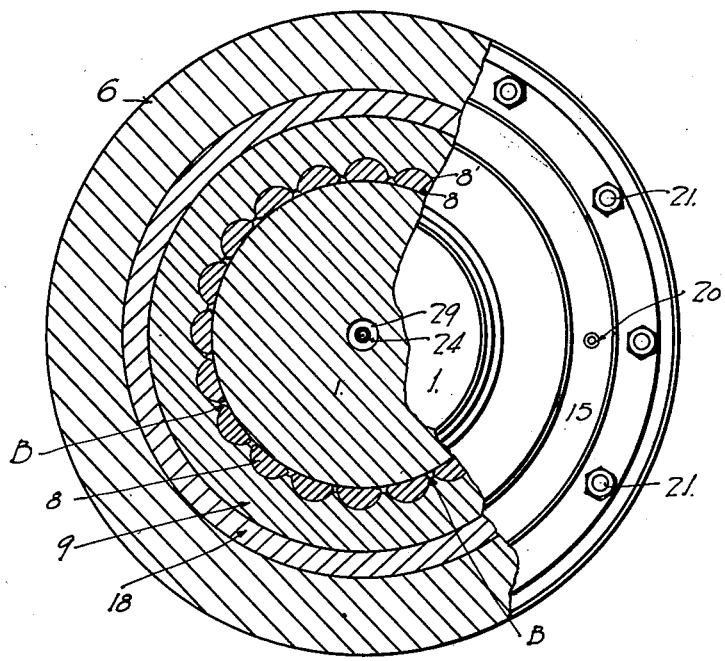
Fig. 2 is a cross sectional view on the line 2—2 of Fig. 1.

Briefly, in the practice of my invention, I provide a nonrotatable shaft 1, which is preferably made from a high grade of steel similar to that of which the rolls themselves are usually made. This shaft is mounted in the end frame 2, which is itself mounted on the mill housing, which is not shown. The mill screw engages the bearing block 4, which is mounted in the end frame 2, and there is provided the split collar 5 so that when the mill screw 3 travels upward, the end frame 2 will be carried along with it. The shaft 1 is provided in the portion which extends between the mill housings with the two oppositely inclined bearing faces 1a, which are separated by the annular groove 1b. The shaft 1 is further provided with a drilled hole 29, which communicates with the two radial holes 30, the central radial hole 28 which communicates with the annular groove 1b, and the radial hole 31. Covering the open end of the hole 29 is the fitting 23, from which a tube 24 of relatively small diameter passes through the bore 29, leaving about it an annular space, to the fitting 25 which is located at the point where the hole 28 communicates with the radial hole 28. A small tube 26, similar to the tube 24, and lying within the hole 28, connects the fitting 25 with the bushing 27, which closes off the hole 28 from the annular groove 1b. The devices immediately above described form part of the lubricating circuit, which will be described fully hereinafter, and complete the structure of the shaft 1.

Figure 3:
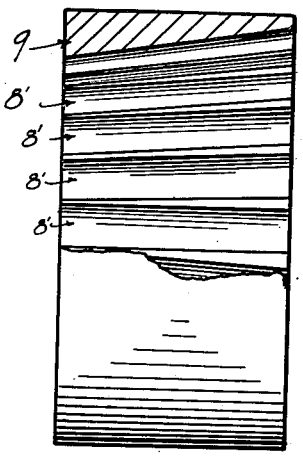
Fig. 3 is an elevation with parts broken away to show the construction, of the outer race of my bearing.
Figure 4:
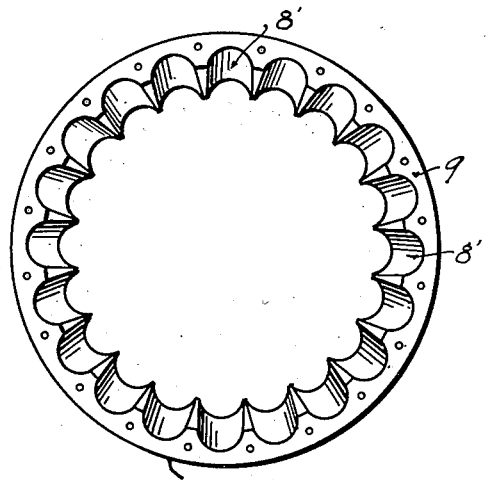
Fig. 4 is an elevation of the outer race as viewed from the right in Fig. 3.
Figure 5:
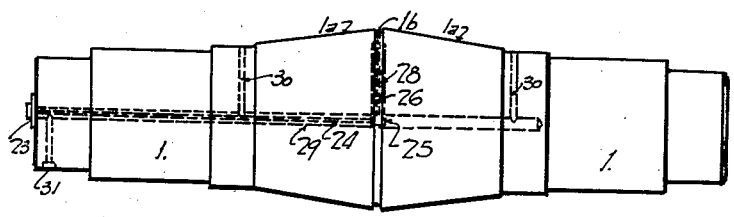
Fig. 5 is an elevation of the stationary shaft and inner race.
Figure 6:
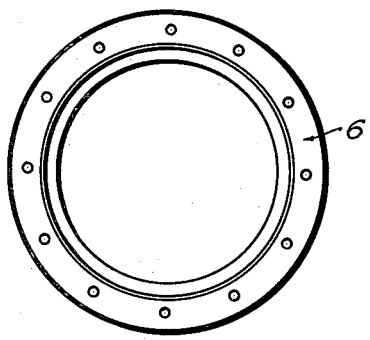
Fig. 6 is an end elevation of the backing up roll.
Figure 7:
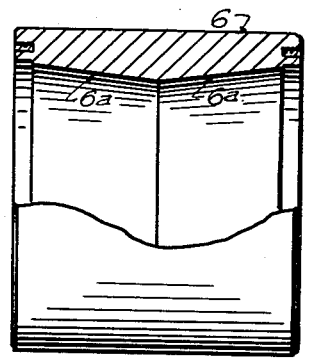
Fig. 7 is a front elevation of the same with parts broken away.
Figure 11:
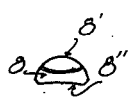
Fig. 11 is an end view of one of the rocking segments.
Figure 12:
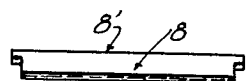
Fig. 12 is a side view of the same.

The outer races are formed from a pair of rings 9, best seen in Figs. 3 and 4. The outer surface of these rings is preferably, though not necessarily, cylindrical, while the inside face is frustroconical and is provided with a plurality of semicylindrical grooves 8'. The ridges between the grooves may be substantially parallel to the inclined faces 1a of the non-rotatable shaft 1. The segments 8 which rest in the grooves 8', and which are best seen in Figs. 11 and 12, have a surface 8' to coincide with the surfaces 8' of the grooves in the outer race 9, and a surface 8" which has a curvature equal to that of the surfaces 1a of the shaft 1. The segments 8 are loosely held in position by means of the clip rings 10 and 11, as is described in detail in my copending application above mentioned.

Figure 8:
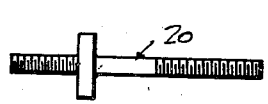
Fig. 8 is an elevation of one of the take-up studs.
Figure 9:
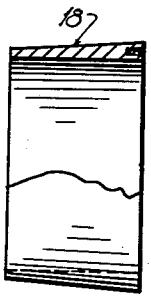
Fig. 9 is an elevation of one of the take up rings with parts broken away.
Figure 10:
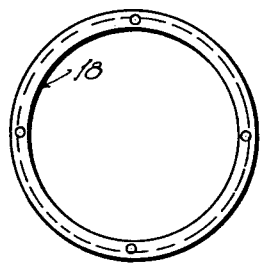
Fig. 10 is an end elevation of the same.

Interposed between the races 9 and the roll 6, are the wedge rings 18, which have corresponding surfaces to engage the outer surfaces of the races 9, and inclined outer faces to engage the inclined inner surfaces 6a of the roll 6. The assembly just described is held in position by means of the flange rings 15 which are bolted to the roll 6 by means of the studs 21. The stud holes in the flange rings 15 are made oversize to allow for expansion of the roll 6. The filler ring 14 serves to hold the races 9 in operative position. As a means for taking up the expansion of the roll 6 due to heating, I have provided the wedge rings 18 with studs 20, which are shown best in Fig. 8. These studs project through the flange ring 15, and are surrounded between the rings 18 and the rings 15 with springs 19. As the roll 6 expands due to heating, the springs 19 force the wedge rings 18 inward, thus taking up any looseness. The studs 20 are provided with threads on their outer ends, so that the wedge rings 18 may be withdrawn by the simple expedient of placing nuts thereon and tightening them, whereby the roll 6 may contract after rolling without danger of damage to the internal parts. I have also shown an oil seal at 22 in the flange ring 15.

The lubrication of my novel bearing is accomplished as follows: Oil under pressure is forced into the tube 24 at the fitting 23, and passes through the connection 25, through the tube 26 and the bushing 27 into the annular space formed by the groove 1b, which space is designated in Fig. 1 at A. Thence the oil flows down between the inclined surfaces 1a of the shaft 1 and the faces 8" of the segments 8, as indicated at B in Fig. 1. The oil then flows into the annular space shown at C in Fig. 1, from whence it flows through the radial holes 30 into the annular hole 29, which communicates with the outlet hole 31. From here the oil may pass through a filtering and cooling operation and be returned through the fitting 23 for further use.

The principle of operation of this bearing is similar to that of the bearing described in my copending application above referred to. The leading edges of the segments 8 are beveled, so that when the outer race bearing the segments rotates about the inner race, a mass of oil is built up at the leading edges of the segments, causing them to rock slightly in the semi-cylindrical grooves, thereby forming wedge shaped films of oil between the moving parts. Since the segments are mounted on the moving member of the bearing, they alternately pass through loaded and unloaded zones, whereby fresh films of oil may be built up during their passage through the unloaded zone.

By using a non-rotating shaft I am able to use very much thicker shafts for the backing up rolls, and by virtue of the fact that the shaft 1 is provided with the two inclined surfaces 1a, the section modulus at the middle section where the maximum bending moment occurs is materially increased, whereby the deflection is reduced to a minimum.

It is to be understood that different forms of my exemplary embodiment may be made without departing from the spirit of my invention.

Having thus described my invention, what I claim as new and desire to secure by Letters Patent, is:—

1. A bearing comprising a non-rotatable supporting shaft having a smooth bearing surface, a rotatable sleeve having a plurality of semi-cylindrical grooves axially disposed therein, a plurality of bearing segments of a substantially semi-cylindrical shape to fit within said grooves and project slightly therefrom, their outer face having a curvature substantially similar to that of the non-rotatable shaft, and means for circulating a lubricating medium to all the frictionally engaging surfaces.

2. A bearing comprising a non-rotatable supporting shaft having a smooth bearing surface, a rotatable sleeve having a plurality of semi-cylindrical grooves axially disposed therein, a plurality of bearing segments of a substantially semi-cylindrical shape to fit within said grooves and project slightly therefrom, their outer faces having a curvature substantially similar to that of the non-rotatable shaft, and means for taking up looseness caused by wear of the parts or expansion of said sleeve due to heat.

3. A bearing comprising a non-rotatable supporting shaft having a smooth bearing surface, a rotatable sleeve having a plurality of semi-cylindrical grooves axially disposed therein, a plurality of bearing segments of a substantially semi-cylindrical shape to fit within said grooves and project slightly therefrom, their outer faces having a curvature substantially similar to that of the non-rotatable shaft, means for taking up looseness caused by wear of the parts or expansion of said sleeve due to heat, and means for circulating a lubricating medium to all the frictionally engaging surfaces.

4. A bearing for taking radial and axial loads comprising a non-rotatable shaft having two smooth bearing surfaces inclined at equal angles to the axis of the shaft, the said surfaces being so disposed that the bearing surface is thicker at the center of the bearing than at its edges, a pair of rotatable sleeves having a plurality of semi-cylindrical grooves axially disposed therein, the said grooves being substantially parallel to the inclined surfaces on said shaft, a plurality of bearing segments of a substantially semi-cylindrical shape to fit within the said grooves and project slightly therefrom, their outer faces having a curvature substantially similar to that of the non-rotatable shaft, and means for circulating a lubricating medium to all frictionally engaging surfaces.

5. A bearing for taking radial and axial loads comprising a non-rotatable shaft having two frustro-conical bearing surfaces disposed with their larger bases adjacent, and a rotatable sleeve carrying a pair of bearing segment carrying rings therein mounted thereupon, and means for circulating a lubricant through said bearing comprising a circuit including a longitudinal hole in said shaft, radial holes in said shaft communicating with said axial hole and with annular spaces in the bearing adjacent the smaller ends of said frustro-conical bearing surfaces, a radial hole communicating with said axial hole near the end thereof, a tube of relatively small diameter disposed within said axial hole and mounted in a fitting which closes off the open end of said axial hole and communicating with a radial tube which communicates with an annular groove separating the larger bases of said frustro-conical portions.

6. A bearing for taking radial and axial loads comprising a non-rotatable shaft having a frustro-conical bearing surface, a rotatable sleeve carrying within it a bearing segment carrying ring, a wedge ring interposed between the inside surface of said sleeve and the outside surface of said segment carrying ring, flange rings bolted to the edges of said sleeve, studs mounted upon the wider edge of said wedge ring and projecting through holes in said flange ring, and helical springs mounted upon said studs and bearing against the wedge ring and the inside face of the flange ring, resiliently urging said segment carrying ring axially toward the larger end of said frustro-conical portion so as to take up slack due to wear, expansion and the like.

7. In a bearing according to claim 6, means to withdraw the said wedge ring in case it has been forced inward on account of expansion of the sleeve due to heat, so that the said sleeve may contract in cooling without danger of injury to internal parts, comprising threads upon the ends of said studs outside the said flange, whereby nuts may be threaded thereon until they bear against the flange and upon further tightening will withdraw the said wedge ring.

8. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members of similar cross section having corresponding faces located within said grooves for rocking motion, and having bearing faces extending slightly beyond said grooves and corresponding substantially with the curvature of the bearing face which they contact.

9. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members of similar cross section having corresponding faces located within said grooves for rocking motion, and having bearing faces extending slightly beyond said grooves and corresponding substantially with the curvature of the bearing face which they contact, said race-way and said segment members being mounted for rotation with said sleeve, whereby all segment members are alternately brought into and out of loaded position.

10. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, and means for taking up play between said sleeve and said race-way.

11. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, means for taking up play between said sleeve and said race-way, there being a plurality of said race-ways having oppositely inclined surfaces, and co-operating bearing faces in connection with said shaft also having oppositely inclined faces, whereby the said sleeve is maintained in centered position with respect to said shaft.

12. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, means for taking up play between said sleeve and said race-way, there being a plurality of said race-ways having oppositely inclined surfaces, co-operating bearing faces in connection with said shaft also having oppositely inclined faces, whereby the said sleeve is maintained in centered position with respect to said shaft, and means for continuously circulating lubricant to said bearing members.

13. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a race-way having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, means for taking up play between said sleeve and said race-way, there being a plurality of said race-ways having oppositely inclined surfaces, co-operating bearing faces in connection with said shaft also having oppositely inclined faces, whereby the said sleeve is maintained in centered position with respect to said shaft, and means for continuously circulating lubricant to said bearing members, said means comprising passageways located within said shaft.

14. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure transmitting purposes with both surfaces between which pressure is transmitted, said means comprising a raceway having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, means for taking up play between said sleeve and said race-way, there being a plurality of said race-ways having oppositely inclined surfaces, co-operating bearing faces in connection with said shaft also having oppositely inclined faces, whereby the said sleeve is maintained in centered position with respect to said shaft; and means for continuously circulating lubricant to said bearing members, said means comprising passageways located within said shaft, the leading edges at least of said segment members in the direction of rotation being beveled, whereby upon tilting of said members a film of oil is built up under pressure between said members and the co-operating bearing surfaces.

15. A rolling mill having working rolls and backing rolls, said backing rolls comprising a stationary central shaft and a rotatable sleeve surrounding said shaft forming the backing face of said rolls, anti-friction bearing means located between said sleeve and said shaft and comprising members, each of which has a substantial area of contact for pressure, transmitting purposes with both surfaces between which pressure is transmitted, said means comprising a race-way having grooves of semi-circular cross section, segment bearing members having corresponding faces located within said grooves for rocking motion, having bearing faces extending beyond said grooves and corresponding substantially with the curvature of the bearing face which they contact, said race-way and said segment members being mounted for rotation with said sleeve, whereby all segment members are alternately brought into and out of loaded position, means for taking up play between said sleeve and said race-way, there being a plurality of said race-ways having oppositely inclined surfaces, co-operating bearing faces in connection with said shaft also having oppositely inclined faces, whereby the said sleeve is maintained in centered position with respect to said shaft, means for continuously circulating lubricant to said bearing members, said means comprising passageways located within said shaft, the leading edges at least of said segment members in the direction of rotation being beveled, whereby upon tilting of said members a film of oil is built up under pressure between said members and the co-operating bearing surfaces, and means at the ends of said sleeve for confining lubricant to the circulating bath aforesaid.

EDWIN B. HUDSON.